US010025115B2

(12) United States Patent
Sessner et al.

(10) Patent No.: US 10,025,115 B2
(45) Date of Patent: Jul. 17, 2018

(54) SPECTACLE LENS HAVING A PLURALITY OF DIFFRACTION STRUCTURES FOR LIGHT

(71) Applicants: Carl Zeiss International GmbH, Aalen (DE); Carl Zeiss AG, Oberkochen (DE); Carl Zeiss Jena GmbH, Jena (DE)

(72) Inventors: Rainer Sessner, Roth (DE); Joerg Petschulat, Jena (DE); Katharina Rifai, Tuebingen (DE); Peter Klopfleisch, Jena (DE); Matthias Burkhardt, Eichenberg (DE); Peter Pacher, Leoben (AT); Timo Kratzer, Aalen (DE); Herbert Krug, Aalen (DE)

(73) Assignees: Carl Zeiss Vision International GmbH, Aalen (DE); Carl Zeiss AG, Oberkochen (DE); Carl Zeiss Jena GmbH, Jena (DE)

( * ) Notice: Subject to any disclaimer, the term of this patent is extended or adjusted under 35 U.S.C. 154(b) by 107 days.

(21) Appl. No.: 15/359,476

(22) Filed: Nov. 22, 2016

(65) Prior Publication Data
US 2017/0075139 A1    Mar. 16, 2017

Related U.S. Application Data

(63) Continuation of application No. PCT/EP2015/061476, filed on May 22, 2015.

(30) Foreign Application Priority Data

May 22, 2014   (DE) .................. 10 2014 209 792

(51) Int. Cl.
*G02C 7/00* (2006.01)
*G02C 7/02* (2006.01)
(Continued)

(52) U.S. Cl.
CPC ........ *G02C 7/063* (2013.01); *B29D 11/00009* (2013.01); *B29D 11/00769* (2013.01);
(Continued)

(58) Field of Classification Search
CPC .......... G02C 7/063; G02C 7/028; G02C 7/06; G02C 2202/20; G02C 2202/22;
(Continued)

(56) References Cited

U.S. PATENT DOCUMENTS 8,317,321 B2 *  11/2012  Haddock ............. G02B 5/1895
                                                351/159.01
9,098,065 B2     8/2015   Hoenel et al.
(Continued)

FOREIGN PATENT DOCUMENTS

WO        2009/079342 A1     6/2009

OTHER PUBLICATIONS

International Search Report dated Sep. 1, 2015 of international application PCT/EP2015/061476 on which this application is based.
(Continued)

*Primary Examiner* — James Greece
(74) *Attorney, Agent, or Firm* — Walter Ottesen, P.A.

(57) ABSTRACT

The invention is directed to a spectacle lens and includes a body which is transparent or at least partly transparent to light and has a phase object which guides the light incident at an angle of incidence α on a side facing away from an observer into a direction depending on the wavelength λ of the light and the angle of incidence α thereof. The phase object has a multiplicity of diffraction structures, which diffract monochromatic light at a wavelength of 380 nm≤λ≤800 nm with a diffraction efficiency of η≥70% into one and same order of diffraction |m|≥1 when the monochromatic light is incident at an angle of incidence α on the side of the lens facing away from the observer which lies
(Continued)

within a diffraction-structure-specific angle interval 15° wide and dependent on the wavelength of the light.

14 Claims, 13 Drawing Sheets

(51) Int. Cl.
  *G02C 7/06* (2006.01)
  *B29D 11/00* (2006.01)
  *G02B 5/32* (2006.01)
  *G02B 27/42* (2006.01)

(52) U.S. Cl.
  CPC ........... *G02B 5/32* (2013.01); *G02B 27/4266* (2013.01); *G02C 7/028* (2013.01); *G02C 7/06* (2013.01); *G02C 2202/20* (2013.01); *G02C 2202/22* (2013.01)

(58) Field of Classification Search
  CPC ........ B29D 11/00009; B29D 11/00769; G02B 5/32; G02B 27/4266

USPC .................................................. 351/159.42
  See application file for complete search history.

(56) References Cited

U.S. PATENT DOCUMENTS

| | | |
|---|---|---|
| 9,411,172 B2 | 8/2016 | Haddock et al. |
| 2001/0050751 A1 | 12/2001 | Banyai et al. |
| 2002/0093701 A1 | 7/2002 | Zhang et al. |
| 2015/0286071 A1 | 10/2015 | Peloux et al. |

OTHER PUBLICATIONS

International Preliminary Report on Patentability dated Nov. 24, 2016 of international application PCT/EP2015/061476 on which this application is based.

* cited by examiner

SPECTACLE LENS HAVING A PLURALITY OF DIFFRACTION STRUCTURES FOR LIGHT

CROSS REFERENCE TO RELATED APPLICATIONS

This application is a continuation application of international patent application PCT/EP2015/061476, filed May 22, 2015, designating the United States and claiming priority from German application 10 2014 209 792.4, filed May 22, 2014, and the entire content of both applications is incorporated herein by reference.

FIELD OF THE INVENTION

The invention relates to a spectacle lens for an observer, comprising a body which is transparent or at least partly transparent to light and has a phase object which guides the light incident at an angle of incidence $\alpha$ on a side distant from the observer into a direction depending on the wavelength $\lambda$ of the light and the angle of incidence $\alpha$ of the light.

The invention also extends to a production method for such a spectacle lens, and to a method for establishing the configuration of such a spectacle lens.

BACKGROUND OF THE INVENTION

A spectacle lens of the type set forth at the outset is known from WO 99/34248 A1. A spectacle lens with holographic optical elements (HOE) lying one above the other is described therein. Here, the holographic optical elements form a volume grating, by means of which the light incident on the spectacle lens at a certain angle of incidence is diffracted, leading to deflection of the light, incident on the spectacle lens, for this angle of incidence.

WO 2014/064163 A1 describes a spectacle lens with a multiplicity of light-diffracting zones, which have a different refractive power.

Spectacle lenses in the form of refractive progressive lenses allow an observer suffering from a visual impairment to be able to observe objects arranged at different distances with a more or less sharp visual impression, even if the accommodation capability of the eyes of this observer is no longer there, for example, due to old age, or greatly limited.

Visual zones are usually defined for the configuration of refractive progressive lenses. These visual zones relate to regions of the surface of a progressive lens penetrated by the viewing direction of an observer. If the observer peers through different visual zones, this observer can see objects at different object distances in focus, without an eye requiring accommodation herefor.

Refractive progressive lenses generally have a distance zone which, when these lenses are used as intended, is penetrated by the viewing direction of an eye of an observer peering into the distance. When peering through the distance zone, the objects arranged at infinity for the observer should be imaged in focus on the retina. Moreover, refractive progressive lenses usually also have a so-called near zone in addition to the distance zone, the near zone being spaced apart from the distance zone and, when the progressive lens is used as intended, being peered through by an observer with a maximum accommodation in order to observe objects arranged at a near distance (for example, 40 cm) in front of the eyes.

Progressive lenses often have a so-called progression channel between the near zone and the distance zone. This progression channel connects the distance zone to the near zone. The refractive power of the progressive lens differs locally in the progression channel. In order to provide a wide visual field to an observer with the progressive lens, attempts are made, as a matter of principle, for the progression channel to be as wide as possible. However, the obtainable width of the progression channel is restricted due to the differential geometric Minkwitz theorem. A consequence of this mathematical theorem is that an observer must accept non-correctable astigmatic imaging aberrations with increasing width of the progression channel, that is, an astigmatism caused by the Minkwitz theorem. Thus, fundamental limits are placed on the imaging quality of refractive progressive lenses and on the possible extent of the near region zone and distance region zone of refractive progressive lenses.

SUMMARY OF THE INVENTION

It is an object of the invention to provide a spectacle lens for an observer, the optical effect of which for different viewing directions can be adapted with an improved imaging quality to the requirements of the observer, and to specify a method for establishing the configuration of such a spectacle lens and a production method for such a spectacle lens.

In the present case, the optical effect of a spectacle lens is understood to mean the property of deflecting light.

The invention is based on the idea that, for an observer with a spectacle lens, different distance regions can be visualized in focus and without the astigmatic imaging aberrations necessarily occurring in the peripheral regions of a progressive lens if the light beams imaging the object region are deflected not by refraction but by diffraction.

In the present case, the diffraction of light is understood to mean the physical phenomenon of the change in the phase of the light, caused by a phase object, on account of interactions between light and matter. Here, a phase object is preferably a transparent object which influences or changes the phase of the light. A phase object needs a diffraction structure in order to diffract light at the phase object. Such a diffraction structure represents a regular, or else irregular, spatial modulation of the complex refractive index, for example, in the form of a grating, which may extend in one dimension or in two dimensions (plane grating) or in three dimensions (volume grating).

A diffraction structure diffracts the light in a manner dependent on the angle of incidence of the light, at which it is incident on the diffraction structure, and in a manner dependent on the wavelength $\lambda$ of the light. If light is diffracted at a diffraction structure, it can be deflected in one or more different, discrete directions due to constructive interference. In the present case, these directions are referred to as orders of diffraction and denoted, in line with general convention, by integers $0, \pm 1, \pm 2, \pm 3, \ldots$, with the central order being denoted by 0 and all further orders being numbered consecutively.

Accordingly, diffraction of the light into an order of diffraction $|m| \geq 1$ is understood to mean the deflection of the light in the direction defined by the order of diffraction which arises by constructive interference of phase-shifted light.

A spectacle lens according to the invention allows an observer, in particular, to perceive objects arranged in different distance regions in focus and without imaging aberrations which distort the visual impression, even in the case of a restricted accommodation capability of the eyes.

A spectacle lens according to the invention has a body which is transparent or at least partly transparent to the light. Thus, such a body is at least partly transparent to the light.

The angle to which a light beam is diffracted by a diffraction structure and the angle at which a light beam diffracted by the diffraction structure may be incident on the diffraction structure increase with increasing absolute value of the order of diffraction in this case. Here, a positive order of diffraction corresponds to a deflection angle for the light, related to the direction of incidence, which is positive; a negative order of diffraction corresponds to a negative deflection angle related to the direction of incidence of the light.

The ratio of the intensity $I_{diffracted}$ of the light diffracted by a diffraction structure into an order of diffraction $|m|\geq 1$ to the intensity $I_{incident}$ of the light incident on a boundary of the diffraction structure at a specific angle of incidence $\alpha'$ is presently referred to as the diffraction efficiency $\eta$ of the diffraction structure. The boundary of a diffraction structure may coincide with the surface of the transparent body of the spectacle lens, but this need not be the case. The boundary of a diffraction structure may also be situated within the transparent body.

The invention exploits the fact that the diffraction efficiency of a diffraction structure in a layer made of an optically transparent material arranged on a carrier is dependent on:
  the wavelength of the light ($\lambda$),
  the refractive index (n) of the material from which the diffractive optical element is constructed,
  the refractive index ($n_0$) of the surrounding medium,
  the thickness (d) of the layer in which the refractive index is modulated,
  the amplitude ($\Delta n$) of the modulation of the refractive index (n),
  the period P of the modulation of the refractive index (n), and
  the angle of incidence ($\alpha'$, $\alpha''$) of the light on a boundary of the diffraction structure.

The implicitly existing relation due to the dependencies between these variables means that it is possible to specify, for a given wavelength, the angle of incidence at which the layer, in which the refractive index is modulated, efficiently diffracts the light incident thereon, that is, in such a way that the diffraction efficiency n is greater than a specific threshold which is fundamentally selectable.

According to the invention, the phase object has a multiplicity of diffraction structures, which diffract monochromatic light at a wavelength of 380 nm$\leq\lambda\leq$800 nm with a diffraction efficiency of $\eta\geq 70\%$ into one and same order of diffraction $|m|\geq 1$ when the monochromatic light is incident at an angle of incidence $\alpha$ on the side of the spectacle lens distant from the observer which lies within a diffraction-structure-specific angle interval which is 15° wide and depends on the wavelength of the light.

In the present case, the angle of incidence of the light on a boundary is understood to mean the angle $\alpha$ formed by the propagation direction of the light with the surface normal $\vec{n}$ of the boundary facing the incident light.

It is advantageous if the phase object of the transparent body of the optical visual aid comprises a multiplicity of diffraction structures, which each deflect all light of a wavelength $\lambda$ lying in a diffraction-structure-specific wavelength interval $\lambda_0\pm 0.1$ μm, the wavelength being incident at an angle of incidence $\alpha$ which lies in a diffraction-structure-specific angle of incidence range $\alpha_0\pm 2.5°$, preferably at an angle of incidence $\alpha$ which lies in a diffraction-structure-specific angle of incidence range $\alpha_0\pm 2°$, on the side of the spectacle lens distant from the observer, with the diffraction efficiency of $\eta\geq 70\%$ into one and same order of diffraction $|m|\geq 1$.

It is possible to deviate from the values, specified above, for the width of the wavelength interval of 0.2 μm and the width of the range for the angle of incidence $\alpha$ and for the threshold $\eta_{min}$ of 70% for the diffraction efficiency $\eta$, without departing from the invention in the process. However, the deviation from the aforementioned values is no more than 20%, preferably no more than 10%, particularly preferably no more than 5%. By way of example, a single diffraction structure in an optical visual aid according to the invention may have a thickness of 17 μm and an extent of approximately 25 square millimeters (mm²). The aforementioned property of a diffraction structure can be achieved by means of, for example, a density LD=1/Λ of light-diffracting structures in the form of a modulated refractive index (line density), where Λ denotes the period of the structures, which is approximately 300 to 5000 lines per millimeter in the case of a refractive index of, for example, n=1.492 and the modulation amplitude of $\Delta n$=0.02. Here, the optically transparent material may be a photopolymer, in particular a photopolymer which has the formulation described in WO 2012/062658 A1, to which reference is herewith made in the entirety thereof and the disclosure of which is included in the description of the present invention.

The diffraction structures are preferably embodied in such a way that, in the parameter plane spanned by the angle of incidence $\alpha$ and the wavelength $\lambda$ with a wavelength parameter axis and an angle of incidence parameter axis, they approximately each have an efficiency window extending along a straight line, which increases monotonically in relation to the wavelength $\lambda$, in which efficiency window the light incident at a specific angle of incidence $\alpha$ on the side of the spectacle lens distant from the observer is diffracted with the diffraction efficiency of $\eta\geq 70\%$ into one and same order of diffraction $|m|\geq 1$ when the parameter pair [$\alpha$, $\lambda$] of the wavelength $\lambda$ and the angle of incidence $\alpha$ of the light, corresponding to a point in the parameter plane, lies in the efficiency window.

A straight line along which the efficiency window extends may, in particular, be a straight line which approximately follows a line passing through the efficiency window and on which the diffraction efficiency is at a maximum. Hence, at the points lying on this line, the gradient of the diffraction efficiency $\eta$ according to the angle of incidence $\alpha$ and the wavelength $\lambda$ in the parameter plane spanned by the wavelength $\lambda$ and the angle of incidence $\alpha$ extends tangentially at this line.

Here, $\delta\leq 0.036°$/nm, preferably $\delta\leq 0.024°$/nm, particularly preferably $\delta\leq 0.012°$/nm, applies to the gradient $\delta$ of the straight line.

According to the invention, the diffraction structures in the parameter plane spanned by the angle of incidence $\alpha$ and the wavelength $\lambda$ with a wavelength parameter axis and an angle of incidence parameter axis can also be embodied in such a way that they each have an efficiency window extending along a straight line, which increases monotonically in relation to the wavelength $\lambda$, between a first tangent parallel to the increasing straight line and a second tangent displaced in parallel to the first tangent in the direction of the angle of incidence parameter axis by the angle $\Delta\alpha\leq 20°$, preferably $\Delta\alpha\leq 15°$, particularly preferably $\Delta\alpha\leq 10°$ or $\Delta\alpha\leq 6°$, in which efficiency window the light incident at a specific angle of incidence $\alpha$ on the spectacle lens is diffracted with the diffraction efficiency of $\eta \geq 70\%$ into one and same order of diffraction $|m| \geq 1$ when the parameter pair $[\alpha, \lambda]$ of the wavelength $\lambda$ and the angle of incidence $\alpha$ of the light, corresponding to a point in the parameter plane, lies in the efficiency window.

Here, the efficiency window may extend approximately symmetrically along the straight line.

To this end, each diffraction structure for light can be, in particular, embodied as a modulation of the complex refractive index $n(\lambda; x,y,z):=n_r(\lambda; x,y,z)+in_i(\lambda; x,y,z)$ of the transparent body in at least one spatial direction.

Here, an amplitude $\Delta n(\lambda)$ of the modulation of the complex refractive index $n(\lambda; x,y,z)$ may, for example, satisfy the following relationship for the light of the wavelength 380 nm$\leq \lambda \leq$800 nm: $0.01 \leq |\Delta n(\lambda)| \leq 0.05$.

It is advantageous if each diffraction structure forms an actuator-compensator pair with a further diffraction structure which is spatially separate from the diffraction structure, wherein the deflections of the light incident at the angle of incidence on the side of the spectacle lens distant from the observer caused by the diffraction structures forming an actuator-compensator pair are at least partly canceled.

Here, the diffraction structures forming an actuator-compensator pair may adjoin one another. However, it is also possible for the phase objects forming an actuator-compensator pair to be spaced apart from one another.

The phase object in the body of the spectacle lens may have an optical effect, that is, a light-deflecting effect, in particular a lens effect. The body may also comprise a phase object which is constructed from layers, lying one above the other, of an optically transparent material with a modulated refractive index. Here, the layers, lying one above the other, of the optically transparent material may be applied to a carrier transparent to the visible light.

Within the scope of the invention, it is possible for the spectacle lens to also have a light-refracting effect in addition to the light-diffracting effect. The optical effect of the spectacle lens is preferably dependent on a viewing direction, passing through the spectacle lens, of the observer.

The body of the spectacle lens, which is transparent or at least partly transparent to the light, may have an edge and two or more connected visual zones which have a different optical effect, extend over the spectacle lens and cover the spectacle lens in the process, wherein the transparent body of the spectacle lens, in this case, has no regions with an astigmatism caused by the Minkwitz theorem.

The invention also extends to a method for establishing the configuration of a spectacle lens, in which
  a geometry and an optical transfer function are predetermined for the spectacle lens; and
  a phase object which has a multiplicity of diffraction structures is calculated for the predetermined optical transfer function and the predetermined geometry, the phase object having a diffractive effect $f(\theta_a)$ which, together with the refractive effect of the spectacle lens, at least approximates the predetermined optical transfer function.

Moreover, the invention also extends to a method for establishing the configuration of a spectacle lens, in which a predetermined optical transfer function at least partly compensates at least one visual impairment of the observer.

Moreover, the invention extends to a production method for a spectacle lens,
  in which a transparent carrier is provided;
  in which an optical layer or a plurality of optical layers made of a photopolymer are applied onto the transparent carrier; and
  in which a hologram of an optical element arranged in a defined position in relation to the optical layer is generated in one optical layer.

BRIEF DESCRIPTION OF THE DRAWINGS

The invention will now be described with reference to the drawings wherein.

DESCRIPTION OF THE PREFERRED EMBODIMENTS OF THE INVENTION

Figure 1:
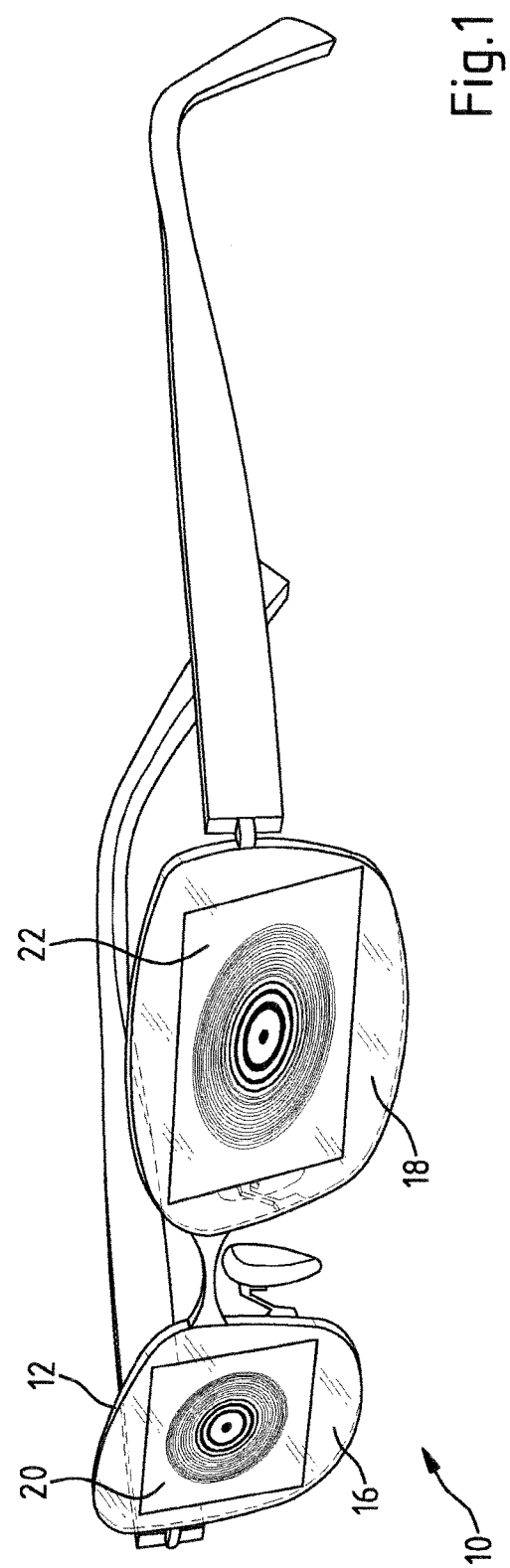
FIG. 1 shows spectacles with a spectacle lens according to the invention.

The spectacles 10 shown in FIG. 1 comprise a spectacle frame 12, in which a left spectacle lens 16 and a right spectacle lens 18 are received. However, the spectacles may also be embodied as a monocle with only one spectacle lens.

The spectacle lenses 16, 18 each have a body that is transparent to the visible light. In principle, the configuration of the spectacle lens 16 corresponds to the configuration of the spectacle lens 18. Preferably, the spectacle lenses 16, 18 have a preferably individualized optical effect, which has been adapted for the left eye and the right eye of an observer. The spectacle lenses 16, 18 have a body which is produced from plastic which transmits the visible light.

There respectively are phase objects 20, 22 in the transparent body of the spectacle lens 16 and of the spectacle lens 18. These phase objects 20, 22 contain a multiplicity of diffraction structures.

Figure 2:
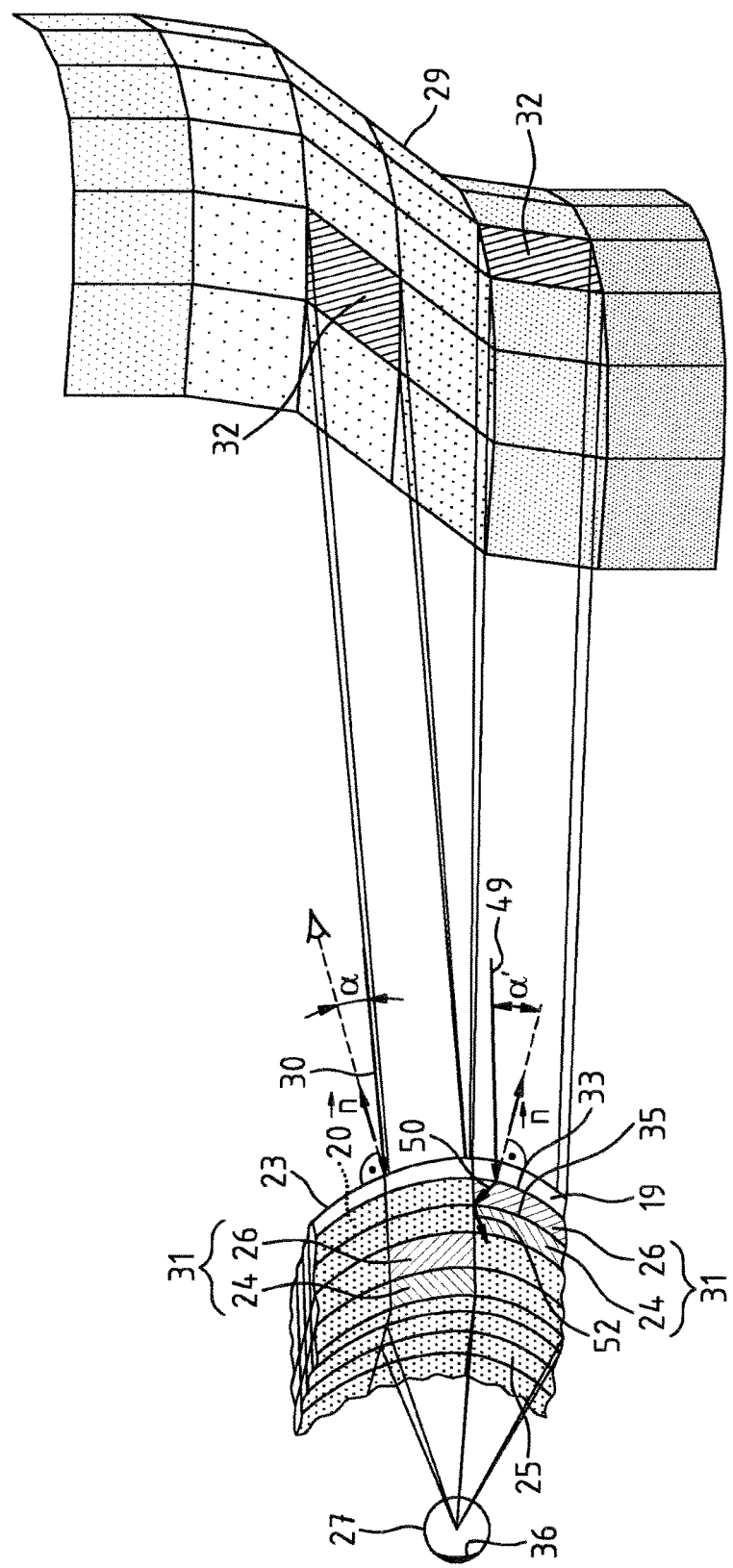
FIG. 2 shows a three-dimensional partial section of a spectacle lens of the spectacles, with an object surface and with an eye of an observer.

FIG. 2 is a three-dimensional partial section of the spectacle lens 16 from FIG. 1. The body of the spectacle lens 16 comprises a carrier 19 made out of an optical plastic. However, in principle, the carrier 19 may also consist of, for example, a mineral glass. The phase object 20 in the body of the spectacle lens 16 has an optical effect. To this end, it has a multiplicity of diffraction structures 24, 26. The light from an object surface 29, which reaches through the spectacle lens front surface 23 and is incident on the spectacle lens front surface 23 in the direction of incidence 30 at the angle of incidence α related to the surface normal $\vec{n}$, passes through the diffraction structures 24, 26 in the spectacle lens 16. This light leaves the body of the spectacle lens 16 through the spectacle lens back surface 25. From there, it is incident on the eye 27 of an observer.

The diffraction structures 24, 26 are embodied as a spatial modulation of the complex refractive index of the transparent body of the spectacle lens 16. In the spectacle lens 16, the second diffraction structure 26 is arranged at a distance from the first diffraction structure 24. That is, the first diffraction structure 24 and the second diffraction structure 26 are spatially separated from one another here. Hence, there is no overlap between the diffraction structures 24, 26 in the spectacle lens 16 in the present case.

Of the many diffraction structures 24, 26 of the phase object of the spectacle lens 16, two form a so-called actuator-compensator pair 31 in each case. In an actuator-compensator pair 31, the deflection of the light which is caused by one diffraction structure, for example, the diffraction structure 26, when the light passes through this diffraction structure is at least partially undone by the other diffraction structure, for example, the diffraction structure 24, if the light also passes through this diffraction structure.

Hence, the phase object of the body of the above-described spectacle lens has a multiplicity of actuator-compensator pairs 31. It should be noted that the diffraction structures forming an actuator-compensator pair 31 need not necessarily adjoin one another but may also be spaced apart from one another.

The phase object of the spectacle lens 16 contains at least one actuator-compensator pair 31 made of two different diffraction structures 24, 26 for each surface segment 32 of the object surface 29, by means of which diffraction structures the light which originates from a surface segment 32 and is incident on the spectacle lens 16 is diffracted in such a way that a sharp image of the relevant surface segment 32 of the object surface 29 arises on the retina 36 of the eye 27 of the observer. Here, the actuator-compensator pairs 31 in the phase object of the spectacle lens 16 bring about an overall image of the object surface 29, constructed from images, which are combined in a mosaic-like manner, of different surface segments 32 of the object surface 29, on the retina 36.

In this case, the light incident on the boundary 33 of the diffraction structure 26 in the propagation direction 49 at the angle of incidence α' lying in the angle of incidence range $\alpha'_0 \pm 2°$ is diffracted with the diffraction efficiency η≥70% in the direction of the first diffraction maximum m=1, which has been identified by the arrow 50. The practical deflection of the light incident on the boundary 35 in the direction of the arrow 50, connected therewith, is at least partly undone again because of the corresponding diffraction of the light in the direction denoted by the arrow 52 in the diffraction structure 24 with the diffraction efficiency η≥70%.

Figure 3:
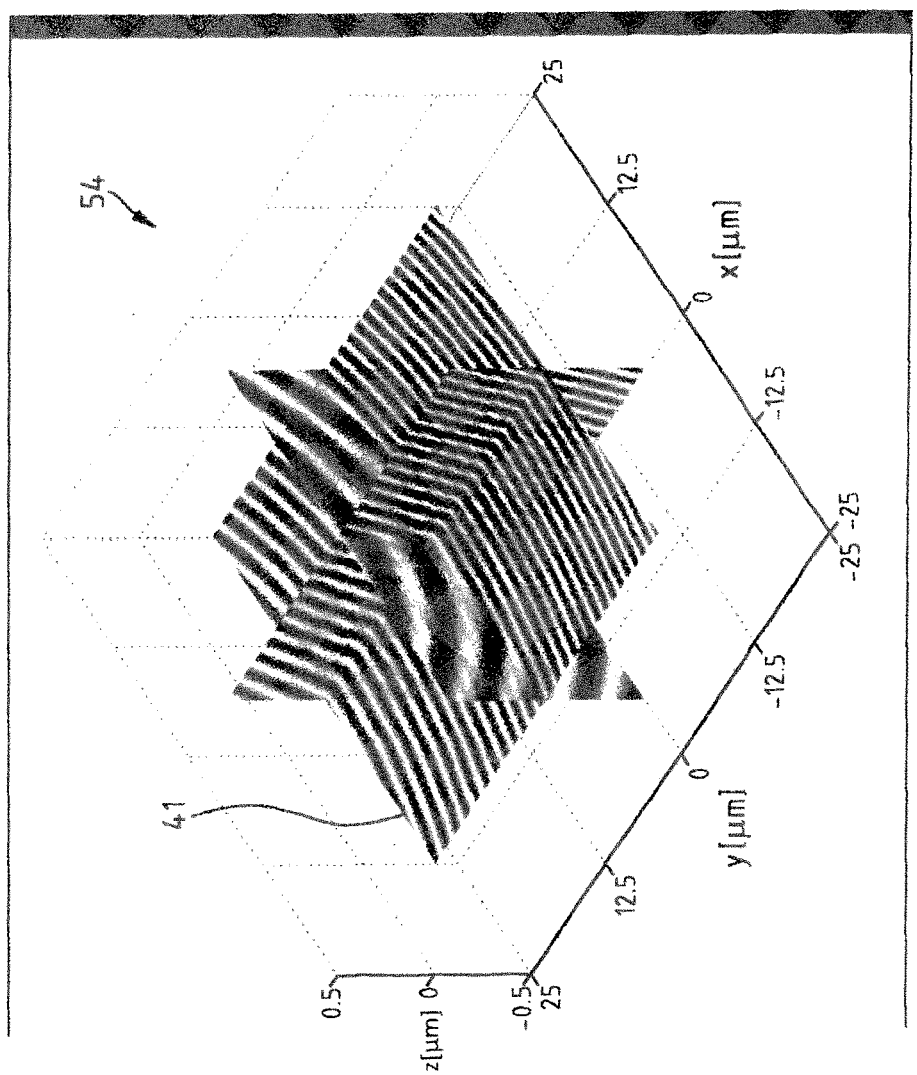
FIG. 3 shows a spatial visualization of a three-dimensional diffraction structure of the spectacle lens.

FIG. 3 is a spatial visualization of a diffraction structure 24, 26 in the transparent body of the spectacle lens 16. The three-dimensional graph 54 in FIG. 3 shows the spatial modulation of the absolute value |n(λ; x,y,z)| of the complex refractive index n(λ; x,y,z):=$n_r$(λ; x,y,z)+i$n_i$(λ; x,y,z) in the three spatial directions x, y, z in a portion of the first diffraction structure 24 as a grayscale image. A brighter grayscale image indicates a greater value of the absolute value of the complex refractive index |n(λ; x,y,z)| in this case.

Figure 4:
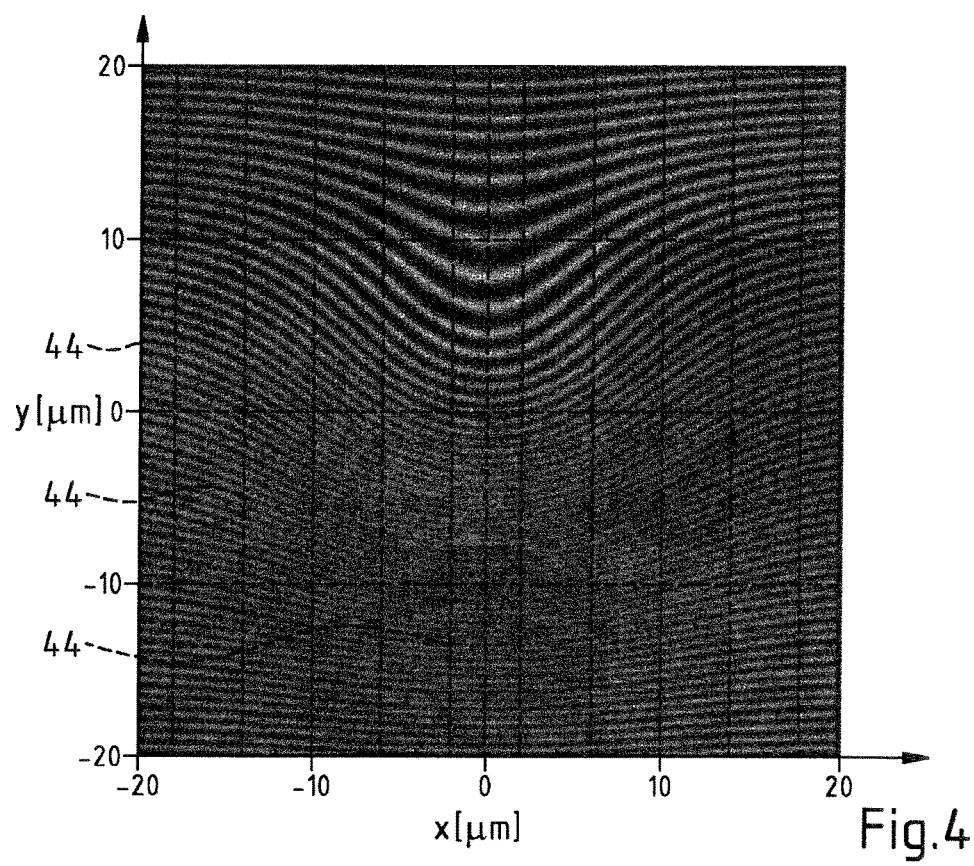
FIG. 4 shows a first visualization of the diffraction structure in a sectional plane identified in FIG. 3.

FIG. 4 visualizes the diffraction structure 24 in the transparent body of the spectacle lens 16 as a grayscale image against the spatial modulation of the absolute value |n(λ; x,y,z)| of the complex refractive index in the partial plane 41, identified in FIG. 3, which is parallel to the xy-plane in FIG. 3. Here too, a brighter grayscale image indicates a greater value of the absolute value of the complex refractive index |n(λ; x,y,z)|.

Figure 5:
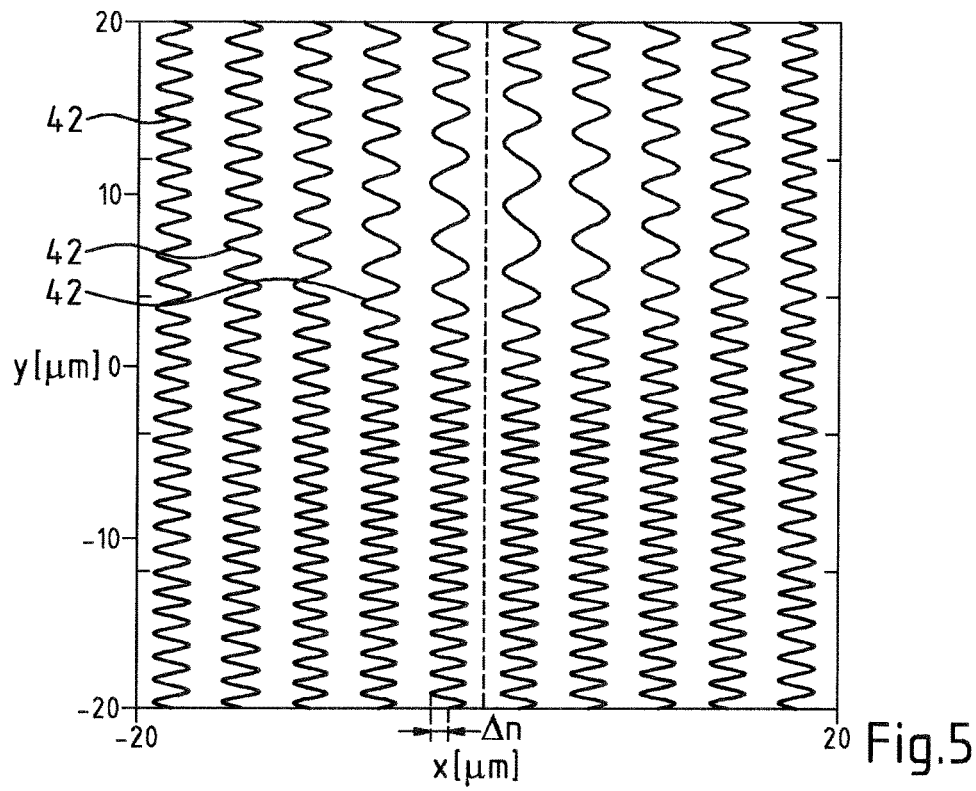
FIG. 5 shows a second visualization of a diffraction structure in the sectional plane identified in FIG. 3.

FIG. 5 visualizes the diffraction structure 24 in the spectacle lens 16 in the partial plane 41 from FIG. 3 on the basis of curves 42 against the modulation of the absolute value of the complex refractive |n(λ; x,y,z)| index along the lines 44 from FIG. 4.

The diffraction structures 24, 26 in the spectacle lens 16 have the property that the amplitude Δn(λ) of the modulation of the complex refractive index n(λ; x,y,z) of the phase object of this diffraction structure satisfies the following relationship for light of the wavelength 380 nm≤|Δn(λ)|≤0.05.

All diffraction structures 24, 26 of the transparent body of the spectacle lens are dimensioned in such a way that they diffract light at a wavelength λ lying in a diffraction-structure-specific wavelength interval $\Delta_0 \pm 0.1$ μm, which light is incident on the boundary 33 facing the object surface 29 (see FIG. 2) at a diffraction-structure-specific angle of incidence α' which lies in a diffraction-structure-specific angle of incidence range $\alpha_0 \pm 2.5°$, with the diffraction efficiency of η≥70% into one and same order of diffraction |m|≥1. Moreover, all diffraction structures 24, 26 have the property that these each diffract monochromatic light at a wavelength within the wavelength range of 380 nm≤λ≤800 nm with a diffraction efficiency of η≥70% into one and same order of diffraction |m|≥1 when the monochromatic light is incident at an angle of incidence α on the optical element 16, 18 which lies within a diffraction-structure-specific angle interval which is 15° wide and depends on the wavelength of the light.

Figure 6:
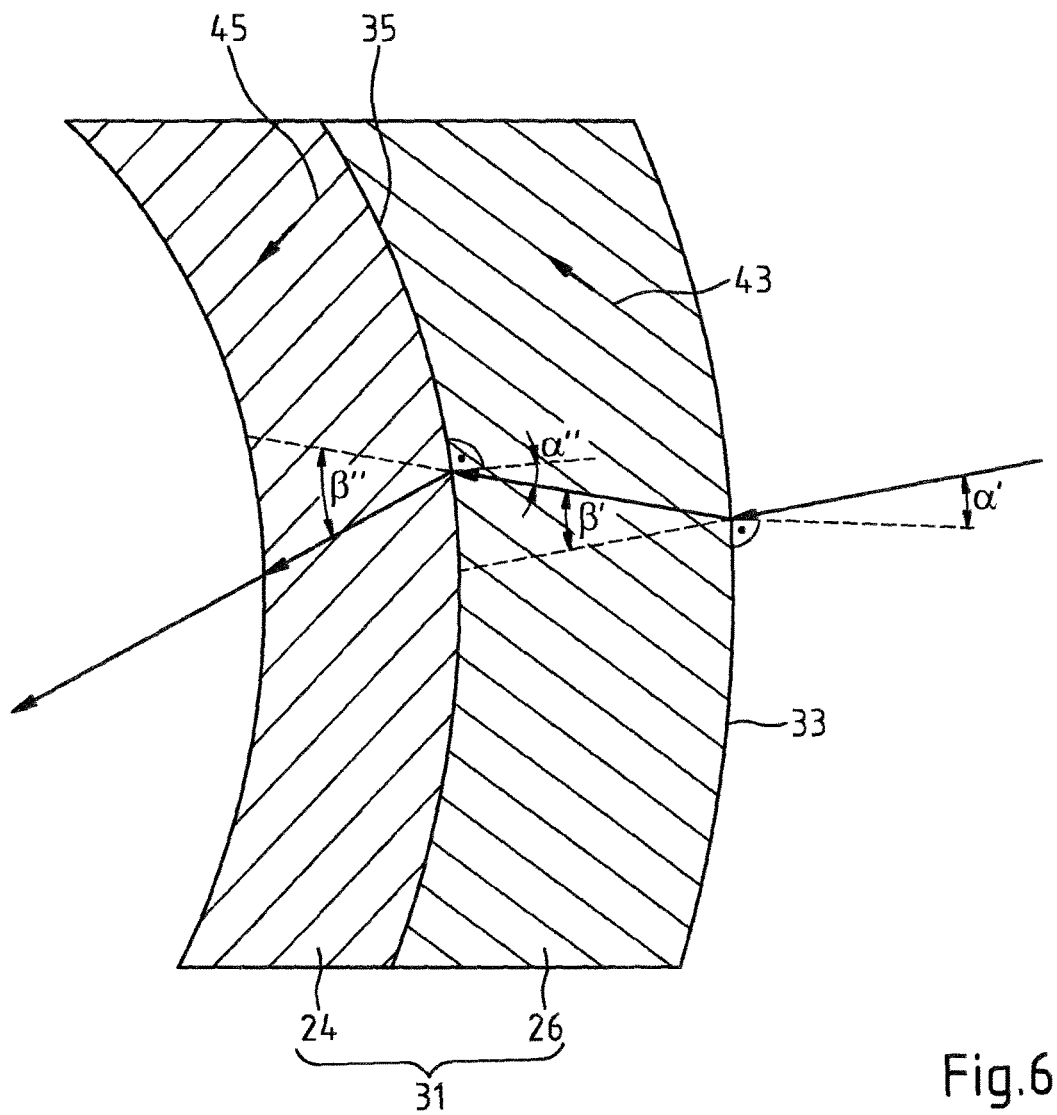
FIG. 6 shows a magnified portion of the partial section shown in FIG. 2.

FIG. 6 is a magnified view of an actuator-compensator pair 31 from FIG. 2. The diffraction structures 24, 26 embodied in the spectacle lens 16 each act as a refractive index volume grating which diffracts light in different directions, the angle of incidence α', α" of the light on the object-side boundaries 33, 35 of the diffraction structure 24, 26 lying within a specific angle of incidence range $\alpha_0' \pm 2°$, $\alpha_0'' \pm 2°$ and the directions corresponding to a deflection angle β', β" which is continuously dependent on the angle of incidence α', α" and related to the object-side boundary 33, 35. It should be noted that the diffractive effect of the diffraction structures 24, 26 is respectively depicted at the object-side boundaries 33, 35 in this view for reasons of simplicity.

The complex refractive index n(λ; x,y,z) in the diffraction structure 26 has a curve which has a translational invariance in the direction of the line 43. Here, in the diffraction structure 24, the complex refractive index n(λ; x,y,z) has translational invariance in the direction of the line 45. It should be noted that, as a matter of principle, the lines 43, 45 can be not only straight, but also curved.

By setting the direction of a local translational invariance of the complex refractive index n(λ; x,y,z) in a diffraction structure 26 of the phase object in the spectacle lens 16, it is possible to set, in a defined manner, the direction in which a light beam which passes through the relevant diffraction structure in the phase object is diffracted.

Here, the invention exploits the fact that, as identified by the inventors, a phase object embodied in the transparent body of a spectacle lens may be constructed from a multiplicity of diffraction structures 24, 26 which diffract light. Here, the diffraction structures in a phase object may also be at least partly overlaid on one another. However, every diffraction structure only diffracts the light whose wavelength λ lies in a specific wavelength range $\lambda_0 \pm \Delta\lambda$ and which is incident on the diffraction structure, in relation to the object-side boundary, at an angle of incidence α' lying in a specific diffraction-structure-specific angle of incidence range $\alpha_0 \pm \Delta\alpha$.

The different diffraction structures matched to a specific wavelength range $\lambda_0 \pm \Delta\lambda$ and a specific angle of incidence range $\alpha'_0 \pm \Delta\alpha'$ for the light do not have any perceivable, light-diffracting influence on light whose wavelength λ and whose angle of incidence α' in relation to the object-side boundary lie outside of the characteristic, diffraction-structure-specific range for the angle of incidence α' and the wavelength λ of a single diffraction structure component.

The spatial overlay of the multiplicity of light-diffracting diffraction structures may be, for example, a volume grating of the complex refractive index. By way of example, such a volume grating can be generated by a holographic adjustment of the complex refractive index of a material, such as, for example, a photopolymer, which is transparent to light lying in the visible spectral range with a wavelength of 380 nm≤λ≤800 nm.

A spatial overlay of a multiplicity of light-diffracting diffraction structure components may, in particular, exist in the form of layers, lying over one another, of an optically transparent material with a modulated refractive index, wherein the layers lying over one another are applied onto a carrier which is transparent to the visible light.

Figure 7:
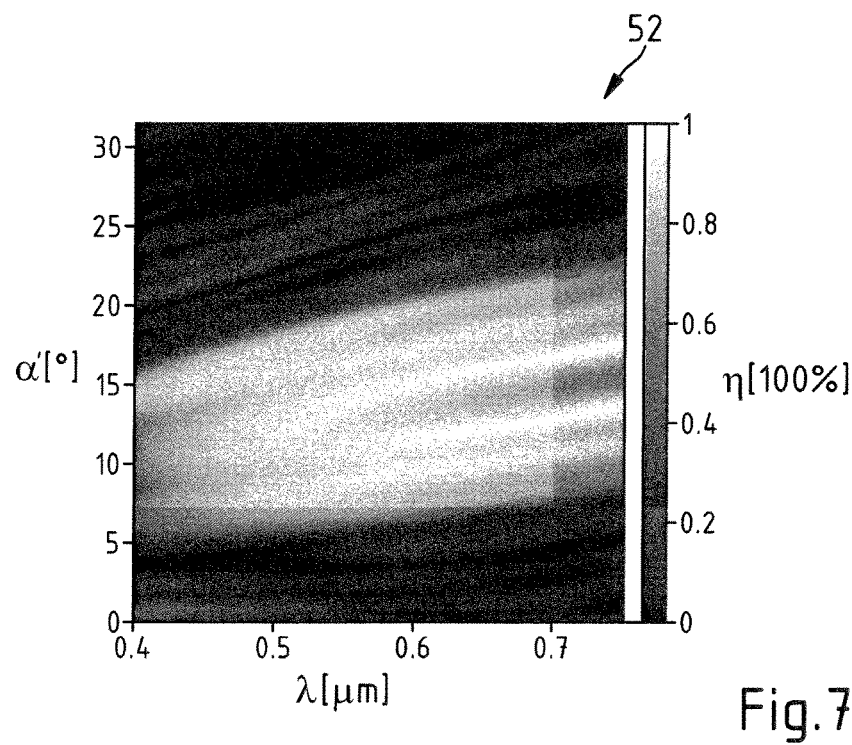
FIG. 7 shows a resultant diffraction efficiency of a plurality of diffraction structures which adjoin one another.
Figure 8:
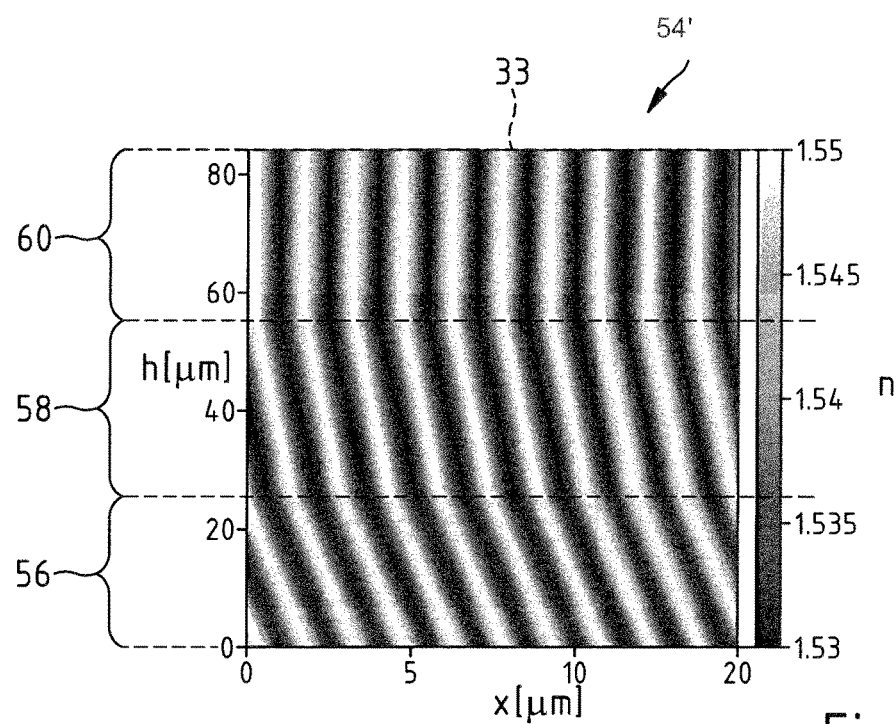
FIG. 8 shows a sectional view with the profile of the refractive index in these diffraction structures.
Figure 10:
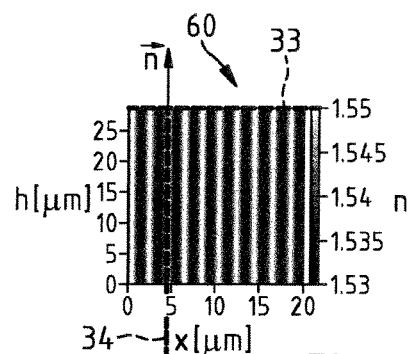
FIG. 10 shows a sectional view with the schematic profile of the refractive index in this first single diffraction structure.
Figure 12:
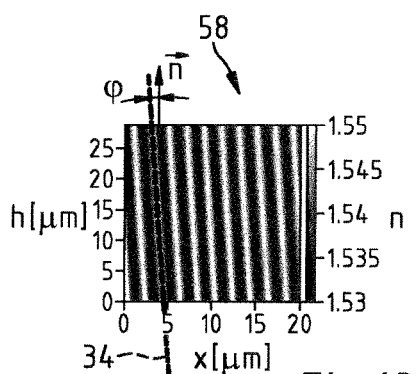
FIG. 12 shows a sectional view with the profile of the refractive index in this second single diffraction structure.
Figure 14:
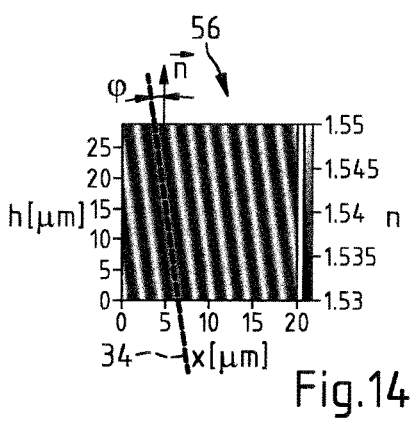
FIG. 14 shows a sectional view with the profile of the refractive index in this third single diffraction structure.
Figure 15:
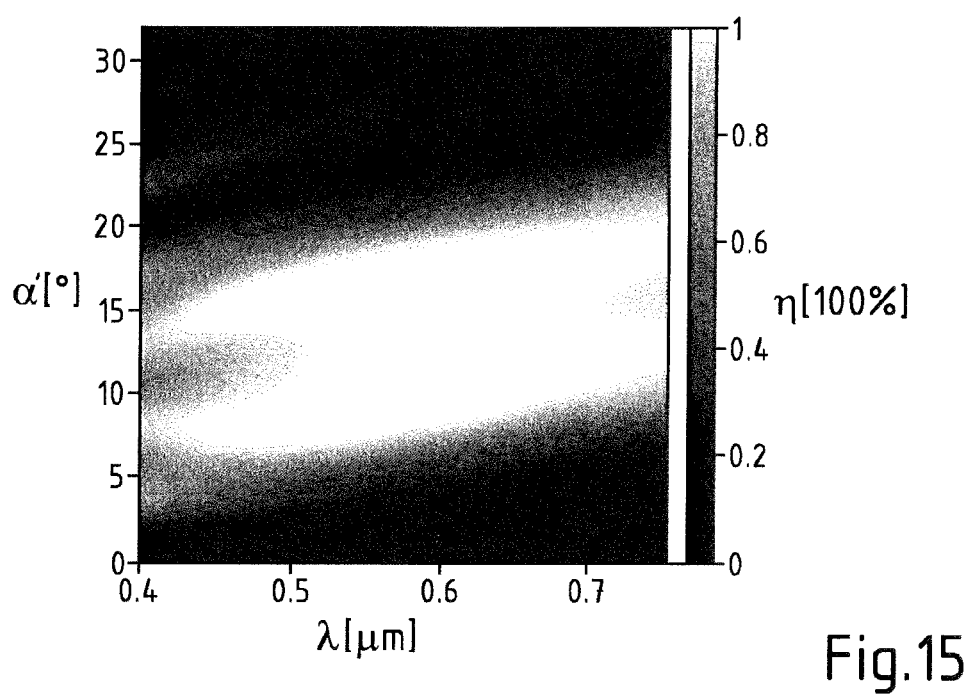
FIG. 15 shows the sum of the diffraction efficiencies of the first, second and third individual diffraction structure.

In this respect, the inventors discovered in comprehensive experiments that the diffraction efficiency η, shown in the graph 52 in FIG. 7 as a grayscale image in the parameter plane spanned by a wavelength parameter axis and an angle of incidence parameter axis, for the on the object-side boundary 33 of a diffraction structure 60, which, together with a diffraction structure 56 and a diffraction structure 58, forms a stack-shaped diffraction structure layer 54' can be described to a good approximation as the overlay $\eta_{VG} = \eta_{VG1} + \eta_{VG2} + \eta_{VG3}$, shown in FIG. 15, of the diffraction efficiencies $\eta_{VG1}$, $\eta_{VG2}$ and $\eta_{VG3}$ of the volume gratings $VG_1$, $VG_2$, $VG_3$, ... of the diffraction structures 56, 58 and 60 shown in FIG. 10, FIG. 12 and FIG. 14.

According to the invention, the diffraction structures 56, 58, 60 each have the property that there is an efficiency window 65 extending along a straight line 57, which increases monotonically in relation to the wavelength λ, in the parameter plane 55 spanned by the angle of incidence α' and the wavelength λ with a wavelength parameter axis 51 and an angle of incidence parameter axis 53. In this efficiency window 65, the light incident at a specific angle of incidence α' on the spectacle lens 16, 18 is diffracted by means of the diffraction structures 56, 58, 60 with the diffraction efficiency of η≥70% into one and same order of diffraction |m|≥1 when the parameter pair [λ, α'] of the wavelength λ and the angle of incidence α' of the light, corresponding to a point in the parameter plane 55, lies in the efficiency window 65.

Figure 9:
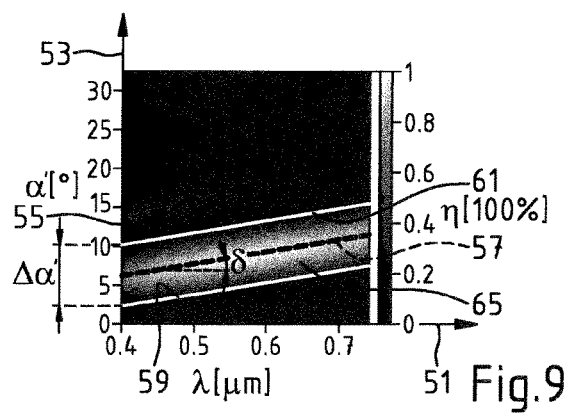
FIG. 9 shows the diffraction efficiency of a first single diffraction structure.
Figure 11:
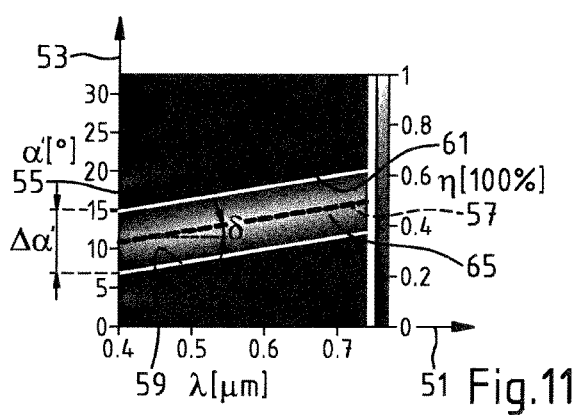
FIG. 11 shows the diffraction efficiency of a second single diffraction structure.
Figure 13:
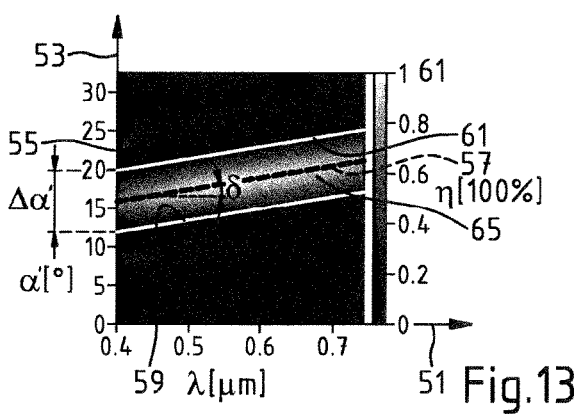
FIG. 13 shows the diffraction efficiency of a third single diffraction structure.

The straight line 57 is approximately an axis of symmetry of the efficiency window 65. Here, the straight line 57 approximately follows a line which passes through the efficiency window and on which the diffraction efficiency has a local maximum in a direction intersecting this line. That is, the efficiency window 65 extends approximately symmetrically along the straight line 57. In the present case, the efficiency window 65 has approximately mirror symmetry in relation to the straight line 57. In the present case, the following applies to the gradient δ of the straight line 57 in FIG. 9, FIG. 11 and FIG. 13: $\delta := 5.3°/400 \text{ nm} \approx 0.012°/\text{nm}$.

The efficiency window 65 of a diffraction structure in a spectacle lens according to the invention has the form of an area surrounded by an elongate ellipse in the parameter plane 55. In the efficiency window 65, the light incident at a specific angle of incidence α on the spectacle lens 16, 18 is diffracted with the diffraction efficiency of η≥70% into one and same order of diffraction |m|≥1. Here, the efficiency window 65 of a diffraction structure lies between a first tangent 59 parallel to the increasing straight line 57 and a second tangent 61 parallel to the first tangent 59. In relation to the first tangent 59, the second tangent 61 is respectively displaced in parallel by the angle $\Delta\alpha \approx 3°$ in this case.

Here, the curve of an efficiency window 65 in the parameter plane 55 can be set by way of the thickness h of the volume grating VG of a diffraction structure, the spatial period of the volume grating VG, that is, the line density 1/Λ of the volume grating VG, and by the angle of inclination φ of the periodic grating planes 34 in relation to the object-side boundary 33 of a volume grating VG.

Figure 16:
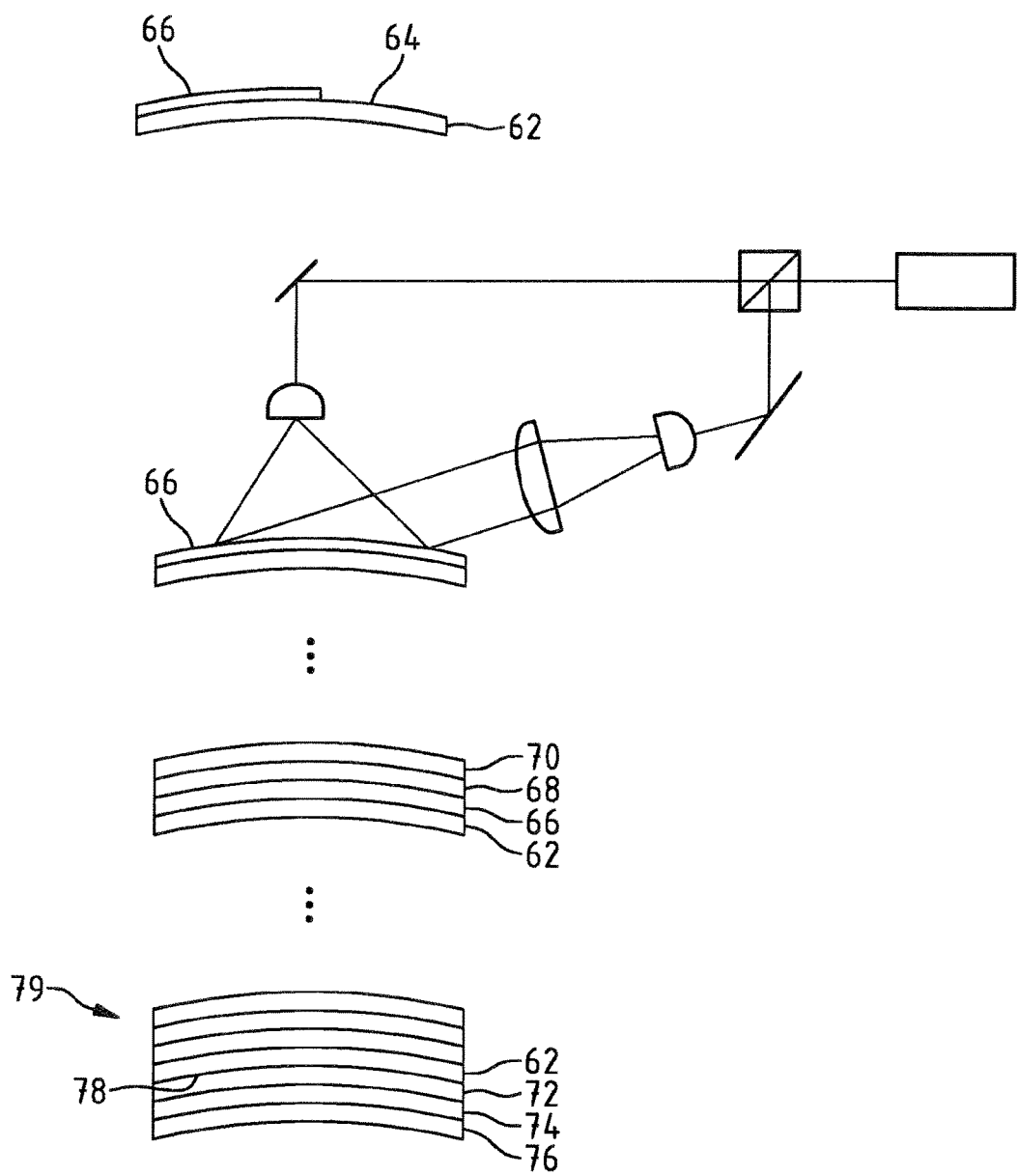
FIG. 16 shows the production of a spectacle lens with diffraction structures.

FIG. 16 explains a method for producing a spectacle lens 79 comprising a phase object constructed from layers, lying over one another, of an optically transparent material, with a multiplicity of diffraction structures in the form of a spatially modulated refractive index being formed in the phase object.

To this end, a transparent carrier 62 is provided in a first step. Then, a first transparent layer 66 made of a photopolymer is applied to a first side 64 of the transparent carrier 62 by means of spin coating, spinning-on or an application by doctoring and/or flat coating or a contact transfer of films.

Thereupon, a multiplicity of diffraction structures in the form of a spatial modulation of the complex refractive index are introduced in a subsequent step into the transparent layer 66 by exposure using a holographic method.

This is preferably carried out by the coherent superposition of light from a light source with the light from this light source reflected at a reference object or with the light from this light source after it has passed through a reference object. However, as an alternative thereto, it is also possible to impress corresponding diffraction structures into the matter, for example, point-by-point by means of a laser beam.

Thereafter, a further transparent layer 68 made of a photopolymer is applied to the layer 66 by means of spin coating or an application by doctoring. This layer is then likewise provided with diffraction structures, for example by way of the holographic method described above. Thereupon, the diffraction structures in the layer 68 are likewise stabilized. Then, a further transparent layer 70, in which diffraction structures are generated in turn, is applied onto the transparent layer 68, and so on.

After producing the layers 66, 68, 70, lying over one another, of an optically transparent material with diffraction structures formed therein on the side 64 of the transparent carrier 62, layers 72, 74, 76, lying over one another, of an optically transparent material with diffraction structures formed therein are produced in the same way on the other side 78 of the transparent carrier 62.

Figure 17:
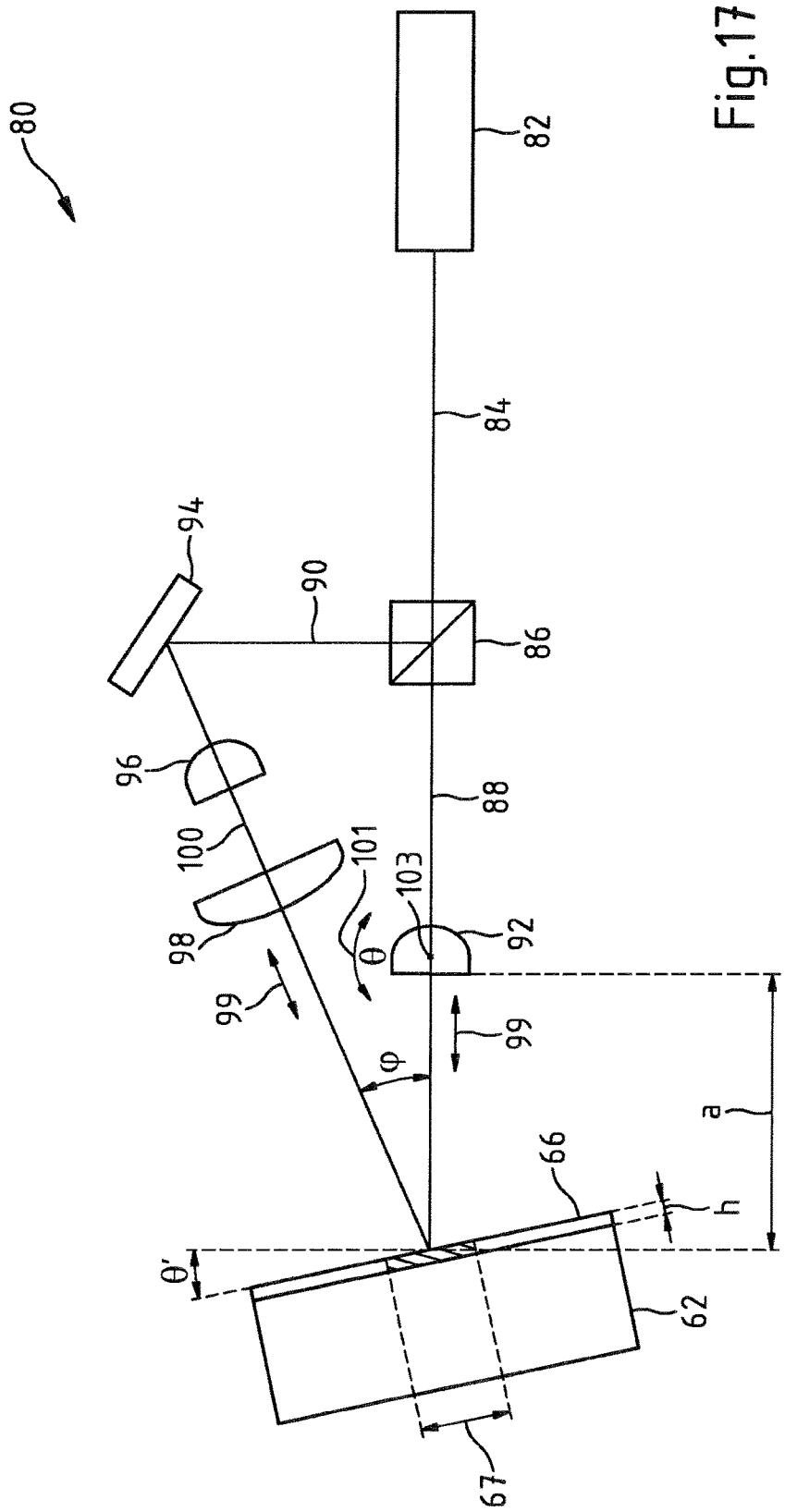
FIG. 17 shows an apparatus for producing diffraction structures on a transparent carrier.

FIG. 17 shows an apparatus 80 for producing light-diffracting diffraction structures in a layer 66 made of a photopolymer, the layer having a thickness h and being applied to a transparent carrier 62.

The apparatus 80 contains a light source, for example, a laser 82, which provides a laser beam 84. The laser beam 84 provided by the laser 82 is split into a first partial beam path 88 and a further partial beam path 90 by means of a beam splitter 86. Then, the partial beam path 88 is directed to the layer 66 by a focusing lens 92. The partial beam path 90 is guided, via a mirror 94, along the optical axis 100 through a focusing lens 96 and a lens element 98 and then coherently superposed on the partial beam path 88 on the layer 66 in an exposure region 67. Here, the focusing lens 92 can be linearly displaced in accordance with the double-headed arrow 99 and tilted about the axis 103 in accordance with the double-headed arrow 101 in order thereby to modify the distance a of the focusing lens 92 from the layer 66 and the angle φ between the optical axes of the partial beam paths 88, 90 interfering in the layer 66.

Thus, the apparatus 80 generates a hologram of the focusing lens 92 in the photopolymer of the layer 66. This hologram has an optical transfer function corresponding to the arrangement of the focusing lens 92. Hence, it is possible to set the spatial profile of the modulation of the complex refractive index in the layer 66 in a defined manner by modifying the interference angle φ, the tilt angle θ of the focusing lens 92, the tilt angle θ' of the carrier 62 or the distance a of the focusing lens 92 from the layer 66. In this case, the period Λ of the generated diffraction structure approximately satisfies the following relationship: $\Lambda \sim \sin \varphi / \lambda$, where λ is the wavelength of the laser light provided by the laser 82. By the successive modulation of the refractive index in different regions of the layer 66, it is possible, in the layer 66, to generate various diffraction structures which are separated from one another in space or which overlap on one another and it is possible to set an optical transfer function for this layer. By the successive generation of holograms in layers 66, 68, 70, 72, 74, 76 made of a photopolymer and applied onto a carrier 62, it is thus possible to provide spectacles with a spectacle lens, the optical effect of which is determined by the diffraction of the light at the diffraction structures realized by means of the holograms in the layers lying one above the other.

Figure 18:
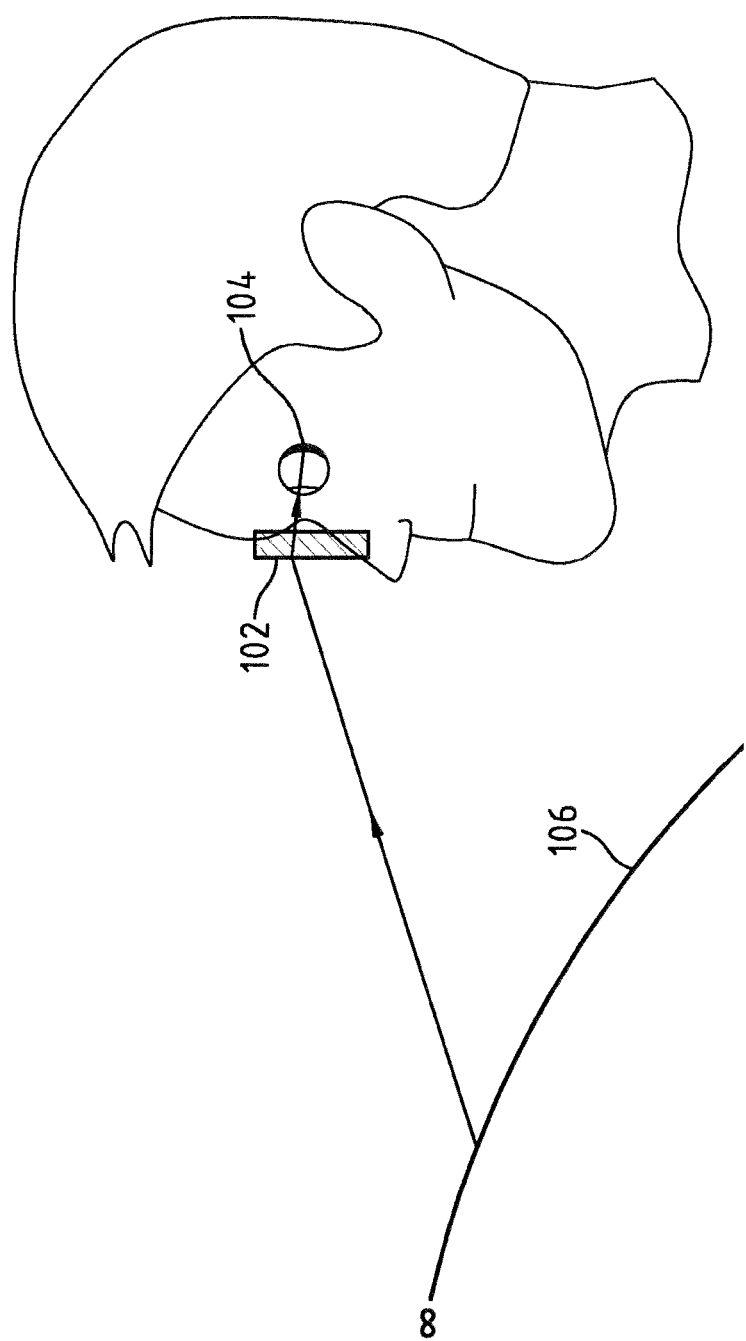
FIG. 18 shows the establishment of the configuration of a spectacle lens with diffraction structures; and, FIGS. 19 to 23 show various spectacle lenses embodied as progressive lenses or multi-focus lenses.

It should be noted that it is also possible to use optical components or combinations of optical components in the apparatus 80 in place of the focusing lens 92 in FIG. 18, for example a focusing lens which is combined with a so-called spatial light modulator or a combination of lens elements which have a focal-plane-tilting property. As a result of this, it is possible to provide not only diffraction structures with a spherical effect in a layer 66, but it is also possible to realize diffraction structures which, inter alia, also enable a correction of lower and higher aberrations of the eye, an induction of lower and higher aberrations, and magnifications and modifications of the focal depth.

FIG. 18 explains a method for establishing the configuration of an optical visual aid for an observer, comprising a spectacle lens 102 with a transparent body, in which a diffraction structure is provided for generating the optical effect of the spectacle lens by deflecting the light by means of diffraction.

In order to establish the configuration of such an optical visual aid, an image surface 104 is predetermined in a first step. An object surface 106 and the position of the optical visual aid are defined in a further step. Then, in a subsequent step, an optical transfer function which images the object surface 106 into the image surface 104 in focus is predetermined for the visual aid. This optical transfer function is then approximated by calculating, with variation, the deflection of the light due to diffraction and, with variation, the diffraction efficiency.

FIGS. 19 to 23 show various spectacle lenses 112a, 112b, 112c, 112d and 112e which have a multifocal or varifocal function and which contain a multiplicity of diffraction structures, as described above, for generating the optical effect.

Figure 19:
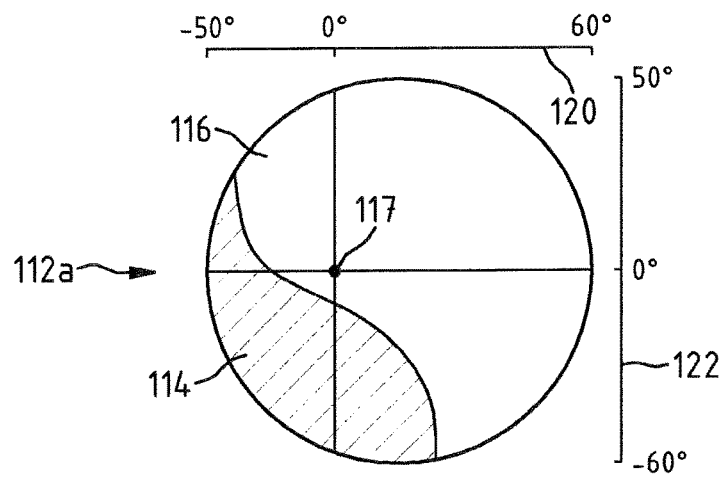

The spectacle lens 112a of FIG. 19 has an optical center 117 which is configured for a viewing direction for looking straight ahead for an eye of an observer, that is, a viewing direction in which the eye assumes a rest position in the case of an ergonomically advantageous head position. For the spectacle lens 112a in FIG. 19, the horizontal and vertical viewing angles in relation to the optical pivot of the eye when looking straight ahead are identified by the axes 120 and 122. In this case, the spectacle lens 112a has a first visual zone 114 and a further visual zone 116. Here, the optical effect of the visual zone 114 differs from the optical effect of the visual zone 116. The spectacle lens 112a has the optical effect corresponding to the refractive power $B_{114}$ for viewing directions which pass through the visual zone 114. In the visual zone 116, $B_{116} < B_{114}$ applies for the refractive power. The refractive power $B_{114}$ of the spectacle lens 112a may be, for example, $B_{114} = 4$ dpt; the refractive power $B_{116}$ may be, for example, $B_{116} = 2$ dpt.

The position of the visual zones 114, 116 in the spectacle lens 112a shown in FIG. 19 renders it possible for an observer to be able to see objects arranged in a near region in focus despite presbyopia when the eyes of the observer carry out a vergence movement, without this requiring an accommodation capability of the eyes of the observer.

Figure 20:
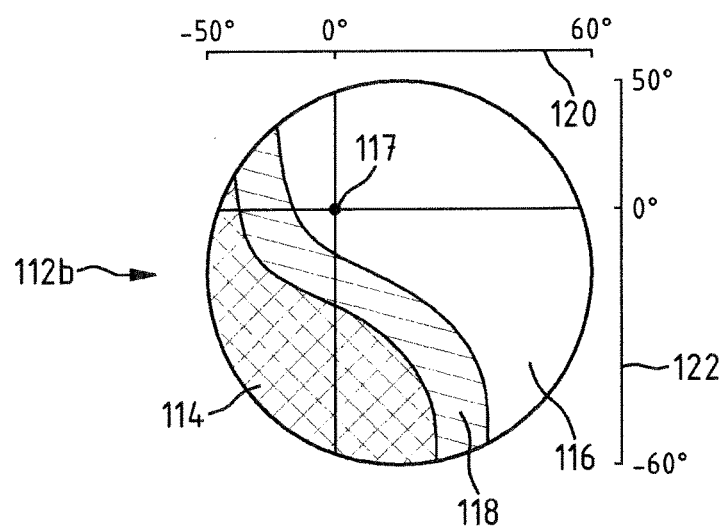

For the spectacle lens 112b in FIG. 20, the horizontal and vertical viewing angles in relation to the optical pivot of the eye when looking straight ahead are likewise identified by the axes 120 and 122. The spectacle lens 112b has the optical center 117 and has three different visual zones 114, 116, 118 with different optical effects corresponding to the refractive power $B_{114} < B_{118} < B_{116}$ in the present case.

Figure 21:
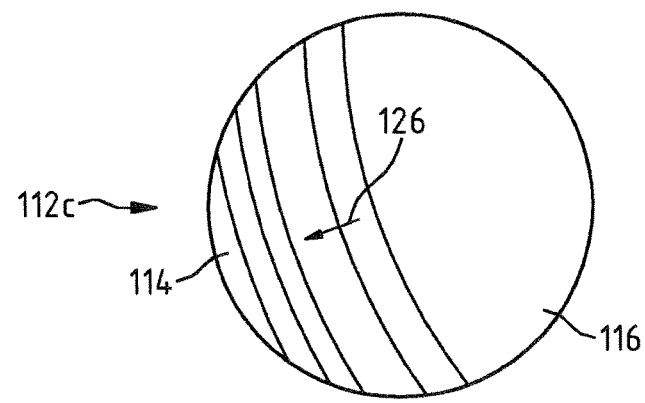
Figure 22:
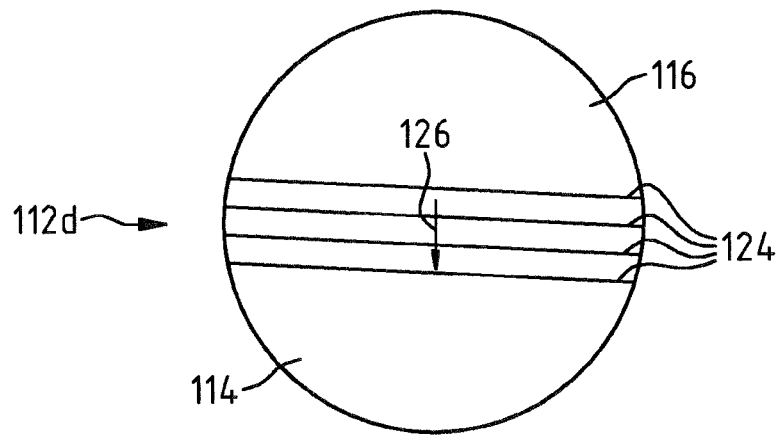
Figure 23:
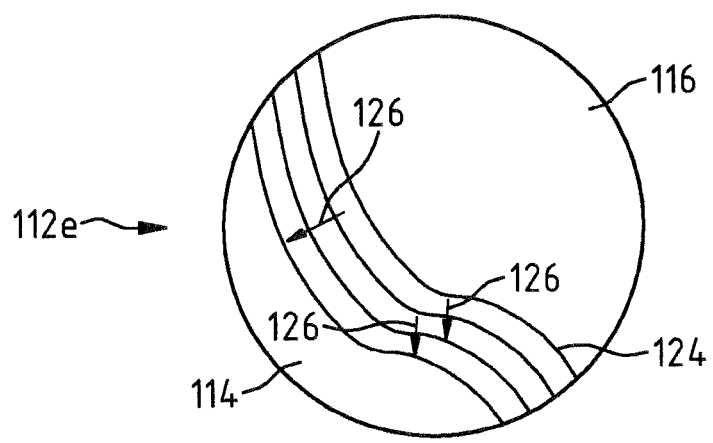

In the spectacle lens 112c, 112d and 112e shown in FIG. 21, FIG. 22 and FIG. 23, the optical effect is identified by lines 124 with the same refractive power. The dioptric effect of the spectacle lenses 112c, 112d and 112e in this case respectively increases in the direction indicated by the arrow 126. In this case, the optical effect is constant in the visual zones 114 and 116 of the spectacle lenses 112d and 112e shown in FIG. 22 and FIG. 23.

As the optical effect of the spectacle lenses 112a, 112b, 112c, 112d and 112e described above is set by means of the diffraction structures, these visual aids do not have regions with an astigmatic effect which is caused by the Minkwitz theorem, unlike conventional progressive lenses based on the refractive effect of a glass body for light.

It should be noted that the invention also extends to a spectacle lens in which combinations of features from different embodiments for diffraction structures, described above, can be found.

In conclusion, the following preferred features should, in particular, be retained: A spectacle lens 16, 18 for an observer comprises a body which is transparent or at least partly transparent to light and has a phase object 20 which guides the light incident at an angle of incidence α on the side distant from the observer into a direction depending on the wavelength λ of the light and the angle of incidence α of the light. The phase object 20 has a multiplicity of diffraction structures 24, 26, which diffract monochromatic light at a wavelength of 380 nm≤λ≤800 nm with a diffraction efficiency of η≥70% into one and same order of diffraction |m|≥1 when the monochromatic light is incident at an angle of incidence α on the side of the spectacle lens 16, 18 distant from the observer which lies within a diffraction-structure-specific angle interval which is 15° wide and depends on the wavelength of the light.

According to another embodiment of the invention, a spectacle lens (16, 18) for an observer, includes a body which is transparent or at least partly transparent to light and has a phase object (20) which guides the light incident at an angle of incidence α on a side of the spectacle lens distant from the observer into a direction depending on the wavelength λ of the light and the angle of incidence α of the light. The phase object (20) has a multiplicity of diffraction structures (24, 26, 56, 58, 60), which diffract monochromatic light at a wavelength of 380 nm≤λ≤800 nm with a diffraction efficiency of η≥70% into one and same order of diffraction |m|≥1 when the monochromatic light is incident at an angle of incidence α on the side of the spectacle lens distant from the observer which lies within a diffraction-structure-specific angle interval which is 15° wide and depends on the wavelength of the light.

Each diffraction structure (24, 26, 56, 58, 60) diffracts all light of a diffraction-structure-specific wavelength λ lying in a diffraction-structure-specific wavelength interval $\Delta_0 \pm 0.1$ μm, said wavelength being incident at an angle of incidence α which lies in a diffraction-structure-specific angle of incidence range $\alpha_0 \pm 2.5°$ on the side of the spectacle lens distant from the observer, with the diffraction efficiency of η≥70% into one and same order of diffraction |m|≥1.

The diffraction structures (24, 26, 56, 58, 60) in the parameter plane (55) spanned by the angle of incidence α and the wavelength λ with a wavelength parameter axis (51) and an angle of incidence parameter axis (53) each have an efficiency window (65) extending along a straight line (57), which increases monotonically in relation to the wavelength λ, in which efficiency window the light incident at a specific angle of incidence α on the side of the spectacle lens distant from the observer is diffracted with the diffraction efficiency of η≥70% into one and same order of diffraction |m|≥1 when the parameter pair [α, λ] of the wavelength λ and the angle of incidence α of the light, corresponding to a point in the parameter plane (55), lies in the efficiency window (65).

The term δ≤0.036°/nm applies to the gradient δ of the straight line (57) or in that δ≤0.024°/nm applies to the gradient δ of the straight line (57) or in that δ≤0.012°/nm applies to the gradient δ of the straight line (57).

The diffraction structures (24, 26, 56, 58, 60) in the parameter plane (55) spanned by the angle of incidence α and the wavelength λ with a wavelength parameter axis (51) and an angle of incidence parameter axis (53) each have an efficiency window (65) extending along a straight line (57), which increases monotonically in relation to the wavelength λ, between a first tangent (59) parallel to the increasing straight line (57) and a second tangent (61) displaced in parallel to the first tangent (59) in the direction of the angle of incidence parameter axis (53) by the angle Δα≤20°, in which efficiency window the light incident at a specific angle of incidence α on the side of the spectacle lens distant from the observer is diffracted with the diffraction efficiency of η≥70% into one and same order of diffraction |m|≥1 when the parameter pair [α, λ] of the wavelength λ and the angle of incidence α of the light, corresponding to a point in the parameter plane (55), lies in the efficiency window (65), or in that the diffraction structures (24, 26, 56, 58, 60) in the parameter plane (55) spanned by the angle of incidence α and the wavelength λ with a wavelength parameter axis (51) and an angle of incidence parameter axis (53) each have an efficiency window (65) extending along a straight line (57), which increases monotonically in relation to the wavelength λ, between a first tangent (59) parallel to the increasing straight line (57) and a second tangent (61) displaced in parallel to the first tangent (59) in the direction of the angle of incidence parameter axis (53) by the angle Δα≤15°, in which efficiency window the light incident at a specific angle of incidence α on the side of the spectacle lens distant from the observer is diffracted with the diffraction efficiency of η≥70% into one and same order of diffraction |m|≥1 when the parameter pair [α, λ] of the wavelength λ and the angle of incidence α of the light, corresponding to a point in the parameter plane (55), lies in the efficiency window (65), or in that the diffraction structures (24, 26, 56, 58, 60) in the parameter plane (55) spanned by the angle of incidence α and the wavelength λ with a wavelength parameter axis (51) and an angle of incidence parameter axis (53) each have an efficiency window (65) extending along a straight line (57), which increases monotonically in relation to the wavelength λ, between a first tangent (59) parallel to the increasing straight line (57) and a second tangent (61) displaced in parallel to the first tangent (59) in the direction of the angle of incidence parameter axis (53) by the angle Δα≤10° or Δα≤6°, in which efficiency window the light incident at a specific angle of incidence α on the side of the spectacle lens distant from the observer is diffracted with the diffraction efficiency of η≥70% into one and same order of diffraction |m|≥1 when the parameter pair [α, λ] of the wavelength λ and the angle of incidence α of the light, corresponding to a point in the parameter plane (55), lies in the efficiency window (65).

The efficiency window (65) extends symmetrically along the straight line (57) and/or in that the straight line (57), along which the efficiency window (65) extends, approximately follows a line passing through the efficiency window (65) on which the diffraction efficiency η is at a maximum.

Each diffraction structure (24, 26) is embodied as a modulation of the complex refractive index $n(\lambda; x,y,z):=n_r(\lambda; x,y,z)+in_i(\lambda; x,y,z)$ of the body in at least one spatial direction.

An amplitude Δn(λ) of the modulation of the complex refractive index n(λ; x,y,z) satisfies the following relationship for light of the wavelength 400 nm≤λ≤800 nm: 0.01≤|Δn(λ)|≤0.05.

Each diffraction structure (24) forms an actuator-compensator pair (31) with a further diffraction structure (26) which is spatially separate from the diffraction structure (24), wherein the deflections of the light incident on the side distant from the observer caused by the diffraction structures (24, 26) forming an actuator-compensator pair (31) are at least partly canceled, and/or in that the phase object (20) has an optical effect, in particular a lens effect, and/or in that the phase object comprises layers (66, 68, 70), lying one above the other, of an optically transparent material with a modulated refractive index, wherein the layers (66, 68, 70) lying one above the other are applied to a carrier (62) transparent to the visible light.

A light-refracting effect is present in addition to the light-diffracting effect. The optical effect thereof is dependent on a viewing direction, passing through the spectacle lens (112a, 112b, 112c, 112d, 112e), of the observer.

The body of the spectacle lens (112a, 112b, 112c, 112d, 112e) has an edge and two or more connected visual zones (114, 116) which have a different optical effect, extend over the body and at least partly cover the body in the process, wherein the body has no regions with an astigmatism caused by the Minkwitz theorem.

A method for establishing the design of a spectacle lens, in which a geometry and an optical transfer function are predetermined for the spectacle lens (102) provides that a phase object which has a multiplicity of diffraction structures is calculated for the predetermined optical transfer function and the predetermined geometry, which diffraction structures diffract monochromatic light at a wavelength of 380 nm≤λ≤800 nm with a diffraction efficiency of η≥70% into one and same order of diffraction |m|≥1 when the monochromatic light is incident at an angle of incidence α on the side of the spectacle lens distant from the observer which lies within a diffraction-structure-specific angle interval which is 15° wide and depends on the wavelength of the light, wherein the phase object has a diffractive effect $f(\theta_a)$ which, together with the refractive effect of the spectacle lens (102), at least approximates the predetermined optical transfer function.

The predetermined optical transfer function at least partly compensates at least one visual impairment of the observer.

A production method is provided for a spectacle lens including a transparent carrier (62), on which an optical layer (66) or a plurality of optical layers (66, 68, 70) are applied. In the production method, a transparent carrier (62) is provided; an optical layer (66) or a plurality of optical layers (66, 68, 70) made of a photopolymer are applied onto the transparent carrier (62); and, a hologram of an optical element (98) arranged in a defined position in relation to the optical layer is generated in one optical layer (66, 68, 70). A phase object which has a multiplicity of diffraction structures is generated on the optical carrier (62) in the process, said phase object having a plurality of diffraction structures, which diffract monochromatic light at a wavelength of 380 nm≤λ≤800 nm with a diffraction efficiency of η≥70% into one and same order of diffraction |m|≥1 when the monochromatic light is incident at an angle of incidence α on the side of the spectacle lens distant from the observer which lies within a diffraction-structure-specific angle interval which is 15° wide and depends on the wavelength of the light.

It is understood that the foregoing description is that of the preferred embodiments of the invention and that various changes and modifications may be made thereto without departing from the spirit and scope of the invention as defined in the appended claims.

LIST OF REFERENCE SIGNS

10 Spectacles
12 Spectacle frame
16, 18 Spectacle lens (optical element)
19 Carrier
20, 22 Phase object
23 Spectacle lens front surface
25 Spectacle lens back surface
24, 26 Diffraction structure
27 Eye
29 Object surface
30 Direction of incidence
31 Actuator-compensator pair
32 Surface segment
33, 35 Boundary
34 Grating plane
36 Retina
41 Partial plane
42 Curve
43, 45 Line
44 Line
49 Direction of propagation
50, 52 Arrow
51 Wavelength parameter axis
53 Angle of incidence parameter axis
54 Graph
54' Diffraction structure layer
55 Parameter plane
56, 58, 60 Diffraction structure
57 Straight line
59, 61 Tangent
62 Carrier
64 Side
65 Efficiency window
66, 68, 70, 72, 74, 76 Layer
67 Exposure region
78 Side
79 Spectacle lens
80 Apparatus
82 Laser
84 Laser beam
86 Beam splitter
88, 90 Partial beam path
92 Focusing lens
94 Mirror
96 Focusing lens
98 Lens element
100 Axis
99, 101 Double-headed arrow
102 Spectacle lens
103 Axis
104 Image surface
106 Object surface
112a, 112b, 112c,
112d, 112e Spectacle lens
114, 116, 118 Visual zones
117 Optical center
120, 122 Axis
124 Line of same refractive power
126 Arrow

What is claimed is:

1. A spectacle lens for an observer, the spectacle lens having a front side facing away from the observer and comprising:

a body transparent or at least partly transparent to light;
said body having a phase object configured to guide light incident on the front side of said spectacle lens at an incident angle α to a surface normal $\vec{n}$ of the front surface of the spectacle lens in a direction dependent upon the wavelength λ of said light and upon said incident angle α;
said phase object having a light-deflecting effect dependent on the viewing direction;
said phase object having a multiplicity of diffraction structures configured to diffract monochromatic light having a wavelength lying in a range of 380 nm≤λ≤800 nm at a diffraction efficiency of η≥70% into one and same order of diffraction |m|≥1 when the monochromatic light is incident at the incident angle α, in relation to a surface normal $\vec{n}$ of said front surface at the location passed by the viewing direction, on said front surface of the spectacle lens which lies within a diffraction-structure-specific angle interval which is 15° wide and depends on the wavelength of the light;

each diffraction structure forming an actuator-compensator pair with a further diffraction structure which is spatially separate from the diffraction structure, wherein the deflections of the light incident on the front surface caused by the diffraction structures forming an actuator-compensator pair are at least partly canceled;

each diffraction structure being configured to only diffract the light whose wavelength $\lambda$ lies in a specific wavelength range $\lambda_0 \pm \Delta\lambda$ and which is incident on the diffraction structure, in relation to an object-side boundary of the diffraction structure, at an angle of incidence $\alpha'$ lying in a specific diffraction-structure-specific angle of incidence range $\alpha_0 \pm \Delta\alpha$, wherein the light which originates from each surface segment of a predetermined object surface is diffracted by one actuator-compensator pair or by a plurality of actuator-compensator pairs in such a way that a sharp image of the relevant surface segment of the object surface may arise on the retina of an eye of the observer; and, wherein the body of the spectacle lens has an edge and two or more connected visual zones which have a different optical effect which is set by the diffraction structures, extend over the body and at least partly cover the body in the process; and, wherein the body has no regions with an astigmatism caused by the Minkwitz theorem.

2. The spectacle lens of claim 1, wherein each diffraction structure diffracts all light of a diffraction-structure-specific wavelength $\lambda$ lying in a diffraction-structure-specific wavelength interval $\lambda_0 \pm 0.1$ µm; and, said wavelength is incident at an angle of incidence $\alpha$ which lies in a diffraction-structure-specific angle of incidence range $\alpha_0 \pm 2.5°$ on said front side, with the diffraction efficiency of $\eta \geq 70\%$ into one and same order of diffraction $|m| \geq 1$.

3. The spectacle lens of claim 1, wherein the diffraction structures in the parameter plane spanned by the angle of incidence $\alpha$ and the wavelength $\lambda$ with a wavelength parameter axis and an angle of incidence parameter axis each have an efficiency window extending along a straight line, which increases monotonically in relation to the wavelength $\lambda$, in which efficiency window the light incident at a specific angle of incidence $\alpha$ on the front side is diffracted with the diffraction efficiency of $\eta \geq 70\%$ into one and same order of diffraction $|m| \geq 1$ when the parameter pair $[\alpha, \lambda]$ of the wavelength $\lambda$ and the angle of incidence $\alpha$ of the light, corresponding to a point in the parameter plane, lies in the efficiency window.

4. The spectacle lens of claim 3, wherein: $\delta \leq 0.036°/nm$ applies to the gradient $\delta$ of the straight line or $\delta \leq 0.024°/nm$ applies to the gradient $\delta$ of the straight line or $\delta \leq 0.012°/nm$ applies to the gradient $\delta$ of the straight line.

5. The spectacle lens of claim 1, wherein the diffraction structures in the parameter plane spanned by the angle of incidence $\alpha$ and the wavelength $\lambda$ with a wavelength parameter axis and an angle of incidence parameter axis each have an efficiency window extending along a straight line, which increases monotonically in relation to the wavelength $\lambda$, between a first tangent parallel to the increasing straight line and a second tangent displaced in parallel to the first tangent in the direction of the angle of incidence parameter axis by the angle $\Delta\alpha \leq 20°$, in which efficiency window the light incident at a specific angle of incidence $\alpha$ on said front side is diffracted with the diffraction efficiency of $\eta \geq 70\%$ into one and same order of diffraction $|m| \geq 1$ when the parameter pair $(\alpha, \lambda)$ of the wavelength $\lambda$ and the angle of incidence $\alpha$ of the light, corresponding to a point in the parameter plane, lies in the efficiency window, or wherein the diffraction structures in the parameter plane spanned by the angle of incidence $\alpha$ and the wavelength $\lambda$ with a wavelength parameter axis and an angle of incidence parameter axis each have an efficiency window extending along a straight line, which increases monotonically in relation to the wavelength $\lambda$, between a first tangent parallel to the increasing straight line and a second tangent displaced in parallel to the first tangent in the direction of the angle of incidence parameter axis by the angle $\Delta\alpha \leq 15°$, in which efficiency window the light incident at a specific angle of incidence $\alpha$ on the side of the spectacle lens distant from the observer is diffracted with the diffraction efficiency of $\eta \geq 70\%$ into one and same order of diffraction $|m| \geq 1$ when the parameter pair $(\alpha, \lambda)$ of the wavelength $\lambda$ and the angle of incidence $\alpha$ of the light, corresponding to a point in the parameter plane, lies in the efficiency window, or wherein the diffraction structures in the parameter plane spanned by the angle of incidence $\alpha$ and the wavelength $\lambda$ with a wavelength parameter axis and an angle of incidence parameter axis each have an efficiency window extending along a straight line, which increases monotonically in relation to the wavelength $\lambda$, between a first tangent parallel to the increasing straight line and a second tangent displaced in parallel to the first tangent in the direction of the angle of incidence parameter axis by the angle $\Delta\alpha \leq 10°$ or $\Delta\alpha \leq 6°$, in which efficiency window the light incident at a specific angle of incidence $\alpha$ on said front side is diffracted with the diffraction efficiency of $\eta \geq 70\%$ into one and same order of diffraction $|m| \geq 1$ when the parameter pair $(\alpha, \lambda)$ of the wavelength $\lambda$ and the angle of incidence $\alpha$ of the light, corresponding to a point in the parameter plane, lies in the efficiency window.

6. The spectacle lens of claim 3, wherein the efficiency window extends symmetrically along the straight line and/or the straight line, along which the efficiency window extends, approximately follows a line passing through the efficiency window on which the diffraction efficiency $\eta$ is at a maximum.

7. The spectacle lens of claim 1, wherein each diffraction structure is embodied as a modulation of the complex refractive index $n(\lambda; x,y,z):=n_r(\lambda; x,y,z)+in_i(\lambda; x,y,z)$ of the body in at least one spatial direction; and, wherein the amplitude $\Delta n(\lambda)$ of the modulation of the complex refractive index $n(\lambda; x,y,z)$ satisfies the following relationship for light of the wavelength 400 nm $\leq \lambda \leq$ 800 nm: $0.01 \leq |\Delta n(\lambda)| \leq 0.05$.

8. The spectacle lens of claim 1, wherein the phase object has a lens effect.

9. The spectacle lens of claim 1, wherein the phase object comprises layers, lying one above the other, of an optically transparent material with a modulated refractive index, wherein the layers lying one above the other are applied to a carrier transparent to the visible light.

10. The spectacle lens of claim 1, wherein a light-refracting effect is present in addition to the light-diffracting effect.

11. The spectacle lens of claim 1, wherein the spectacle lens is a progressive spectacle lens.

12. A method for determining the design of a spectacle lens, wherein a geometry and an optical transfer function are predetermined for the spectacle lens, the method comprising the steps of:

provide an object surface with a multiplicity of surface segments;

calculating a phase object, which has a light-deflecting effect dependent on the viewing direction and has a multiplicity of diffraction structures for the predetermined optical transfer function and the predetermined geometry by which diffraction structures monochromatic light at a wavelength of 380 nm≤λ≤800 nm is diffracted with a diffraction efficiency of η≥70% into one and same order of diffraction |m|≥1 when the monochromatic light is incident at the angle of incidence α, in relation to a surface normal $\vec{n}$ of the spectacle lens front surface at the location passed through by the viewing direction, on the side of the spectacle lens facing away from the observer which lies within a diffraction-structure-specific angle interval which is 15° wide and depends on the wavelength of the light;

wherein the phase object has a diffractive effect $f(\theta_a)$ which, together with the refractive effect of the spectacle lens, at least approximates the predetermined optical transfer function, and wherein each diffraction structure forms an actuator-compensator pair with a further diffraction structure which is spatially separate from the diffraction structure, wherein the deflections of the light incident on the side facing away from the observer caused by the diffraction structures forming an actuator-compensator pair are at least partly canceled;

wherein every diffraction structure only diffracts the light whose wavelength λ lies in a specific wavelength range $\lambda_0 \pm \Delta\lambda$ and which is incident on the diffraction structure, in relation to an object-side boundary of the diffraction structure, at an angle of incidence α' lying in a specific diffraction-structure-specific angle of incidence range $\alpha_0 \pm \Delta\alpha$; and, wherein the light which originates from each surface segment of a predetermined object surface is diffracted by means of one actuator-compensator pair or by a plurality of actuator-compensator pairs in such a way that a sharp image of the relevant surface segment of the object surface may arise on the retina of an eye of the observer.

13. The method of claim 12, wherein the predetermined optical transfer function at least partly compensates at least one visual impairment of the observer.

14. A production method for a spectacle lens including a transparent carrier, on which an optical layer or a plurality of optical layers are applied, the method comprising the steps of:

providing the transparent carrier;

applying a plurality of optical layers made of a photopolymer onto the transparent carrier; and, generating in each optical layer a hologram of an optical element arranged in a defined position in relation to the optical layer;

generating a phase object, which has a light-deflecting effect depending on the viewing direction and has a multiplicity of diffraction structures, on the optical carrier in the process, said phase object having a plurality of diffraction structures, by which monochromatic light is diffracted at a wavelength of 380 nm≤λ≤800 nm with a diffraction efficiency of η≥70% into one and same order of diffraction |m|≥1 when the monochromatic light is incident at the angle of incidence α, in relation to a surface normal $\vec{n}$ of the spectacle lens front surface at the location passed through by the viewing direction, on the side of the spectacle lens facing away from the observer which lies within a diffraction-structure-specific angle interval which is 15° wide and depends on the wavelength of the light, wherein each diffraction structure forms an actuator-compensator pair with a further diffraction structure which is spatially separate from the diffraction structure;

at least partially canceling the deflections of the light incident on the side distant from the observer caused by the diffraction structures forming an actuator-compensator pair;

wherein every diffraction structure only diffracts the light whose wavelength λ lies in a specific wavelength range $\lambda_0 \pm \Delta\lambda$ and which is incident on the diffraction structure, in relation to an object-side boundary of the diffraction structure, at an angle of incidence α' lying in a specific diffraction-structure-specific angle of incidence range $\alpha_0 \pm \Delta\alpha$; and, wherein the light which originates from each surface segment of a predetermined object surface is diffracted by one actuator-compensator pair or by a plurality of actuator-compensator pairs in such a way that a sharp image of the relevant surface segment of the object surface can arise on the retina of an eye of the observer.

* * * * *